Figure 1:
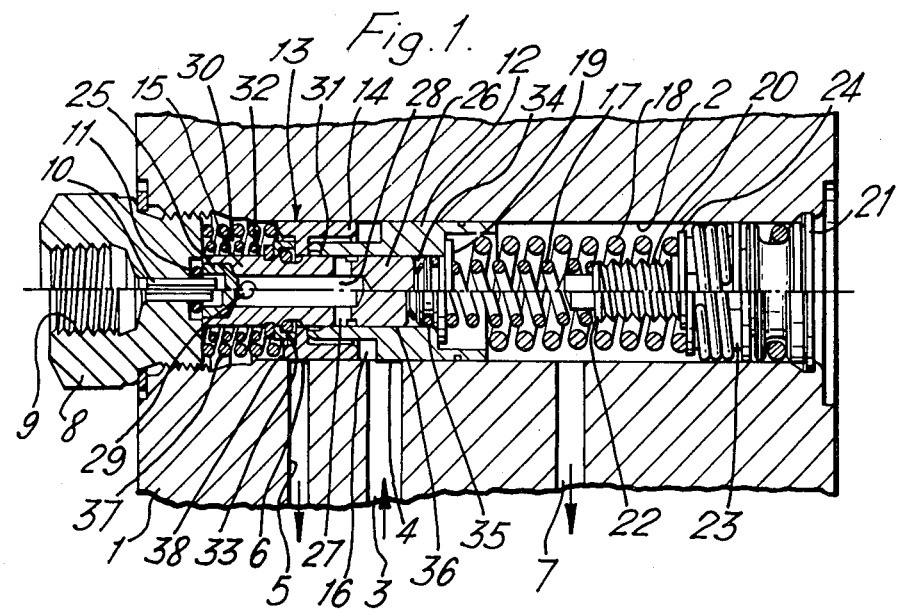

United States Patent
Petersen et al.

[15] 3,687,154
[45] Aug. 29, 1972

[54] PRESSURE-REGULATING AND CUT-OFF VALVE FOR FUEL-OIL PUMPS

[72] Inventors: Jorgen Hartvig Petersen, Nordborg; Ingvard Mosby Madsen, Sonderbogg, both of Denmark

[73] Assignee: Danfoss A/S, Nordborg, Denmark

[22] Filed: Dec. 10, 1970

[21] Appl. No.: 96,720

[30] Foreign Application Priority Data

Dec. 16, 1969 Germany..........P 19 62 975.5

[52] U.S. Cl..............................137/116, 137/116.3
[51] Int. Cl............................................G05d 11/00
[58] Field of Search.........137/115, 116, 116.3, 116.5

[56] References Cited

UNITED STATES PATENTS

| | | | |
|---|---|---|---|
| 2,395,941 | 3/1946 | Rockwell | 137/115 X |
| 2,793,498 | 5/1957 | Banker | 137/115 X |
| 2,421,325 | 5/1947 | Griswold | 137/115 X |
| 2,858,842 | 11/1958 | Reis | 137/115 X |
| 2,257,702 | 9/1941 | Murphy | 137/116 |
| 3,011,507 | 12/1961 | Hansen | 137/116 |
| 3,532,104 | 10/1970 | Hoen | 137/116 |
| 2,362,352 | 11/1944 | Buttner | 137/505.12 |
| 2,478,040 | 8/1949 | Campbell et al. | 137/505.42 |
| 2,599,577 | 6/1952 | Norgren | 137/505.18 X |

*Primary Examiner*—M. Cary Nelson
*Assistant Examiner*—David J. Zobkiw
*Attorney*—Wayne B. Easton

[57] ABSTRACT

The invention relates to a pressure regulating and cut-off valve for fuel pumps which includes a setting piston and a combination of two pistons for regulating the pressure outlet between predetermined pressure levels. A pair of springs are provided for resisting movement of the setting piston which are arranged in parallel and have different rectilinear spring rates. The providing of this pair of springs results in space saving, permits a wider adjustment range and is less affected by manufacturing tolerance deviations.

1 Claim, 4 Drawing Figures

PRESSURE-REGULATING AND CUT-OFF VALVE FOR FUEL-OIL PUMPS

The invention relates to a pressure-regulating and cut-off valve for fuel-oil pumps, in which valve a piston is biased by a spring arrangement which determines the closing pressure and the required level of the pressure to be kept constant.

The purpose of such valves is to keep the pressure at the nozzle of an oil-heated system at a constant level that, as far as possible, is adjustable. This is done by returning part of the oil delivered by the pump to the pump intake side or to the oil container by way of a return orifice which is opened to a varying extent depending upon the pressure conditions. Furthermore, the valve performs the function of keeping a valve, disposed in the nozzle supply line, firmly closed when the oil is not under a sufficiently high pressure, and in particular of closing this latter valve as abruptly as possible when, upon the pump being switched off, the pressure drops below a predetermined minimum level.

Valves of this kind are known in which the piston is biased by a helical spring which is supported by a displaceable backing element. The pressure-regulating and cut-off valve is incorporated in the casing of an oil pump and consequently only a short space is available for fitting the spring. This results in a number of difficulties, particularly when, using the same oil pump, it is required to set the nozzle pressure, that has to be kept constant, within a wider range. The cut-off function is considerably poorer in the lower range within which a setting is made than in the upper range. In some cases the closure pressure of the spring is insufficient. The permissible tolerances as regards the dimensions and assembly of the valve elements as well as regards the characteristics of the spring must be kept very low since otherwise considerable changes in the performance of the valve occur as a result of the small length of distance for fitting the spring.

The object of the invention is to provide a pressure-regulating and cut-off valve of the initially described kind which, despite a small length of distance for fitting the spring arrangement, operates properly within a wide setting range and is less affected by manufacturing tolerances.

According to the invention, this object is achieved by the force constant of the spring arrangement increasing as the piston is displaced in the direction for opening.

By this alteration of the spring constant, an excellent cut-off performance is achieved over a wide setting range. Even taking into account all the tolerances, the closing pressure is considerably less dependent than previously upon the nozzle pressure that has been set. Nevertheless, the working point can be on a steep portion of the spring characteristic curve, so that it is also possible to take into account the fact that even slight displacement of the piston leads to a not inconsiderable change in the cross-section of the return orifice and thus of the pressure conditions.

It is particularly advantageous if the spring characteristic curve is composed of two straight branches with a sharp bend between them. With a spring characteristic curve of this kind it is particularly simple to suit the steeper branch to the conditions occurring during regulation of the pressure, particularly in the upper setting range, and the flatter branch to the conditions in the closed position and as occurring in the cut-off function, particularly in the lower setting range.

Expediently, the flatter branch is fixed and the steeper branch for setting to the required value is displaceable parallel to itself. This results in a setting of the required value that has no effect whatsoever on the closing force.

There are various possible ways of constructing the spring arrangement. For example, a single spring can be coiled in such a way that it has the required characteristic curve. In a preferred embodiment of the invention however, the spring arrangement consists of two springs arranged in parallel, the second of which springs lies loose in the closing position of the piston, so that only the first is effective in the lower part of the spring characteristic curve. These two individual springs can be normal helical springs each having a rectilinear characteristic curve.

Preferably, a fixed backing element is associated with the first spring and an adjustable backing element with the second spring. In the closed position the first spring has a predetermined bias. The required level of pressure at the nozzle is set only with the help of the second spring.

Although the spring arrangement claimed can be used for all pressure-regulating and cut-off valves of the initially stated kind, it is preferably used in a valve in which the piston is a setting piston, which is loaded by the supply pressure in the direction opposite to that in which the spring arrangement sets and which, together with the regulating piston, constitutes a restrictor, which carries the closure member of the cut-off valve, overrides a return orifice, and is loaded on the one hand by the supply pressure and on the other by the pressure behind the restrictor and a differential-pressure spring. This arrangement enables a particularly fine adjustment to be carried out which, in conjunction with the novel spring characteristic curve, gives optimum results.

In this connection, it is particularly advantageous if the regulating piston consists of a first regulating element, which overrides the return orifice, and of a second element which constitutes the closure member, these elements being coupled to move substantially in synchronism, but being axially displaceable relatively to each other in such manner that the closure elements can also be moved along by the spring arrangement independently of the regulating element. In this way, the cut-off movement initiated by the spring arrangement is accelerated.

Figure 4:
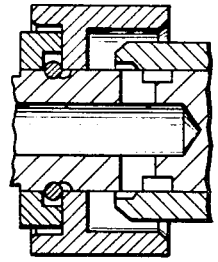
Figure 2:
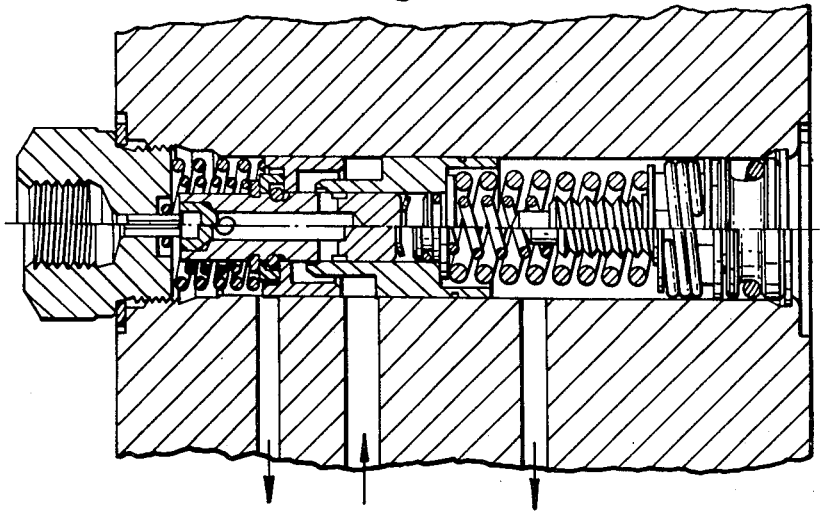
Figure 3:
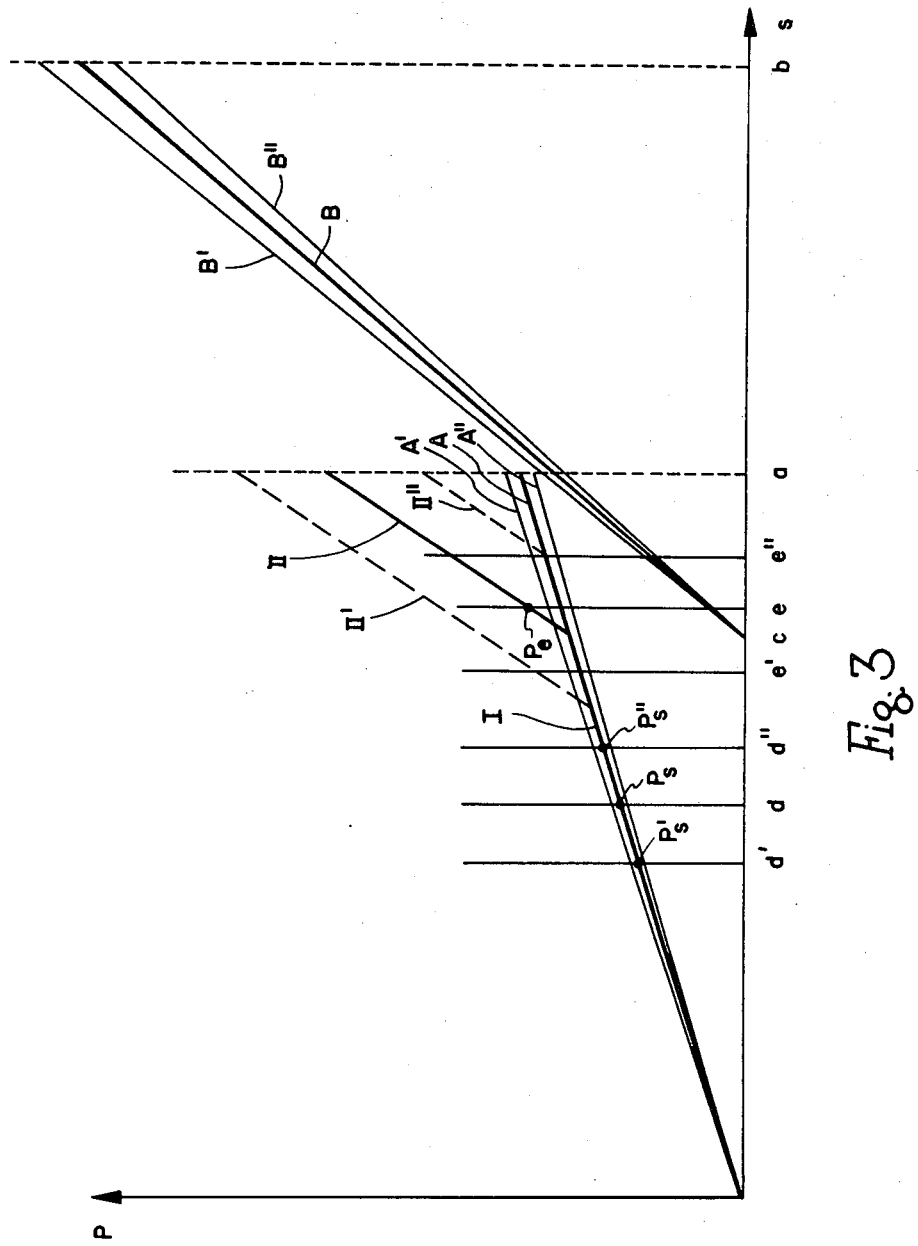

The invention will now be described in more detail by reference to an embodiment illustrated in the drawing, in which:

FIG. 1 shows a longitudinal section through a valve of the invention in the closed position, the upper half of the drawing illustrating an assembly with maximum tolerances, i.e. with the smallest length of spring, and the upper half illustrating an assembly with minimum tolerances, i.e. with the greatest length of spring, FIG. 2 is a section similar to that of FIG. 1, but through an open valve, FIG. 3 illustrates the characteristic curve of the spring arrangement employed, and FIG. 4 is a partial view of the valve, in enlarged scale, in the position shown in FIG. 2.

The casing 1 of an oil pump has a bore 2 in which is fitted a pressure-regulating and cut-off valve. A supply passage 3, connected to the pressure side of the pump, terminates at 4 in the bore 2, and a return passage 5, connected to the suction side of the pump or to the oil container, also terminates in the bore 2 at 6; also provided is a relief passage 7 which communicates with the suction side of the pump. At one of the ends of the bore 2 is an insert 8, which has a screw-thread 9 for connecting the nozzle pipe, and carries a hollow clamping pin 10 having an O-ring 11. The latter acts as the seat of the cut-off valve.

Provided in the bore 2 is a setting piston 12 and a regulating piston 13. The latter consists of a regulating element 14, constituted by an annular piston, and of a closure element 15, which is coupled with the regulating element 14 so that they move substantially in synchronism.

On the one side the setting piston 12 is subjected to the pressure of the supply fluid contained in the chamber 16 and, at the other side it is biased by two springs 17 and 18 which can bear against a backing plate 19. A screw 20 is inserted in that end of the bore 2 remote from the insert 8. This screw is axially held by a circlip 21. Its lower end-face 22 forms a fixed bearing element for the first spring 17. By rotating the screw a nut 23 can be axially displaced, this nut forming a displaceable backing element 24 for the second spring 18. In the closed position illustrated in FIG. 1, the setting piston 12 is biased only by the first spring 17, whereas the second spring 18 lies loose.

At one end the closure element 15 forms a closure member 25 of the cut-off valve and at its opposite end there is disposed a cylinder 26 which is inserted in the setting piston 12. The closure member contains transverse and longitudinal bores 27, 28 and 29, whereby the chamber 16 can be connected to a chamber 30 on the opposite side of the regulating element 14 when the bore 27 is overriden by an annular groove 31 on the inside of the setting piston 12. The closure element is acted upon by a pressure-applying spring 32 which, with the help of the coupling parts 33, ensures that the closure member, during normal operation, follows the movement of the regulating element 14. Between the cylinder 26 and the backing plate 19 there is a chamber 34 which is sealed off on one of its sides by a sealing ring 35, but which can be filled with oil through a circumferential gap 36 acting as a restrictor. This chamber also contains a cup-spring acting as a damping means.

The regulating element 14 is subjected at one end to the pressure in the chamber 16 and at the other to the pressure in the chamber 30 as well as to the force of a differential-pressure spring 37. A pressure differential is caused, during normal operation, by the drop in pressure at a restrictor which is formed by the bore 27 and the circumferential groove 31. Consequently, the regulating element 14 takes up a position such that its end edge 38 uncovers a certain cross-section of the mouth 6 of the return passage 5.

When the pump is started up and the pump pressure rises, the setting piston 12 is first pushed to the right, whereas the regulating piston 13 remains in its at-rest position. While this is happening, only the first spring 17 is initially compressed, and the spring 18 is compressed when the pressure rises further. After a certain period of time, the restrictor 27, 31 opens and compressed fluid enters the chamber 30. Consequently, the regulating element 14 also moves into a position determined by the pressure-drop at the restrictor. The closure element 15 follows this movement. This corrects the size of the restrictor 27, 31. A stable operating condition is established. The regulating element 14 is able rapidly to response to quite small fluctuations in pressure, whereas the closure element 15 remains stationary on account of the resilient coupling and the oil-damping in the chamber 34. Larger fluctuations in pressure however can also react on the restrictor through the closure element.

If the pump is switched off, the pressure in the chamber 16 drops, and the springs 17 and 18 push the setting piston 12 to the left. Since this happens at a considerable speed, the oil in the chamber 34 acts as a transmission means, so that the closure element 15 is moved along and the cut-off valve 11, 25 is rapidly closed. During this movement, the closure element 15 becomes disengaged from the regulating element 14. During its movement the closure element 15 displaces fluid in the chamber 30, so that excess pressure is created in the chamber. Consequently, the regulating element 14 is pushed a little to the right, so that the excess pressure can be relaxed without difficulty. Because of the action of the spring 17, all the oil is then expelled from the chamber 34 until finally the at-rest position illustrated in FIG. 1 is again reached.

FIG. 3 is a force-travel graph showing a characteristic curve of the spring arrangement, which curve can be specifically applied in accordance with the invention. The spring 17 has a characteristic curve A, and the curves A' and A'' could indicate the manufacturing tolerances. The point a indicates that position in which the spring 17 is fully compressed. The characteristic curve of the spring 18 is indicated by B for when the backing member 24 is in a particular position, the curves B' and B'' again indicating the tolerance range. In position b spring 18 would be fully compressed. Since the spring 18 lies loose, it is first compressed when the piston 12 reaches the point c with the spring 17 compressed. The piston is then loaded by the sum of the forces from the two springs 17 and 18. Consequently, there is obtained a spring characteristic curve having a first flatter branch I and a second steeper branch II. The steeper branch can be displaced parallel to itself by moving the backing member 24 of the spring 18. The branches II' and II'' for example are then obtained.

In the closed position, the setting piston 12 occupies the position d. There are no difficulties in so selecting the spring 17 that the closing pressure $P_s$ that obtains suffices to keep the cut-off valve firmly closed, even when account is taken of all the factors which can arise in such a system, such as whether the oil container is located in a high or low position. Position d' corresponds to the closing position of the piston when the spring 17 is at its maximum length, i.e. when the axial assembly tolerances of the other parts of the valve are minimal (lower half of FIG. 1). The position d'' corresponds to the closing position of the piston in the case of a short spring 17, i.e. in the case of maximum tolerance for the other component parts (upper half of FIG. 1). The two associated closing pressures $P_s'$ and $P_s''$ differ only slightly from $P_s$.

The position $e$ will correspond to an operating position of the setting piston 12 in which this piston is loaded by a required pressure $P_e$. A state of balance is then achieved in which the regulating piston 13 has uncovered the mouth of the return passage to a certain extent, so that the pressure in the chamber 30 corresponds to the required nozzle pressure. The positions $e'$ and $e''$ again indicate the extent to which the point $e$ can be displaced as a result of assembly tolerances. If, because of these differences in tolerance, the required value $P_e$ deviates too much, this can be dealt with by displacing the branch II.

If, in a valve that had a definite working point at the position $e$, it is required to obtain a high required value, the spring 18 must be tensioned more firmly and the branch II displaced towards II'. If a lower required value is to be set, the spring 18 must be relaxed and the branch II thus displaced towards II''.

As a consequence of the special spring characteristic curve, the following positive effect is also achieved to give instant cut-off. If a high required value is set, i.e. the mouth 6 of the return passage is uncovered only to a very slight extent, then when the pump is switched off a slight drop in pressure suffices to cause the cut-off valve to close. This small drop in pressure is achieved very rapidly when the pump is heavily loaded. If on the other hand, a low required value is set, i.e. if the mouth 6 of the return passage is opened very wide, then upon switching off of the pump, which of course runs at a higher speed because of the lower load, the pressure-regulating valve tries to keep the pressure in the chamber 30 constant by closing the mouth 6 of the return passage to a corresponding extent. Since however, when the required value is low, this procedure occurs over the flatter branch I of the spring characteristic curve, a greater displacement of the piston is associated with a smaller change in pressure, so that in this case too the closing position is reached vary rapidly. In particular, it is possible in all cases to cause the cut-off action to take place reliably and rapidly if the pump speed drops below about two-thirds of the synchronized speed.

In all therefore, there is provided a valve construction which can be acted upon by very large spring forces in a small space, so that within like dimensions a higher upper limit to the pressure regulation range can be used. Assembly tolerances can be compensated by the fixed spring 17, so that these tolerances have no appreciable effect upon the operation of the valve. The required pressure value can be set in a much simpler manner, since the setting is achieved merely by means of one of the two springs. Last but not least, a considerably improved cut-off characteristic curve is obtained over the entire setting range. The principle of the invention can also be applied to a known pressure-regulating and cut-off valve, in which the piston, loaded by the springs, directly supports the closure member of the cut-off valve and constitutes part of the pressure-regulating slide.

We claim:

1 A pressure regulating and cut off valve assembly comprising a housing forming a cylindrical bore, a supply passage, a main outlet passage, a return passage, said passages having fluid communication with said bore, a setting valve piston slidably in said bore and being cooperable with said supply passage, said setting valve piston being movable over predetermined range in response to pressurized fluid admitted to said supply passage, regulating valve means including a regulating valve piston slidably in said bore and being cooperable with said return passage and a cut off valve carried by said regulating valve piston and being cooperable with said main outlet passage, spring means biasing said regulating valve means in an opening direction, first and second parallel arranged springs in said bore for engaging and biasing said setting valve piston in a closing direction, said first spring engaging said setting valve piston over its entire range and said second spring having such engagement only during the end portion of said range, said regulating valve means forming with said housing a chamber which is communicable with said outlet and return passages through the operation of said regulating valve means, control passage means in said regulating valve means providing communication between said chamber and said supply passage, control valve means for said control passage means between said regulating valve piston and said setting valve piston, said control valve means being operable in response to relative movement between said setting valve piston said regulating valve piston whereby supply fluid is admitted to said chamber for moving said regulating valve means in an opening direction against the biasing resistance of both said first and second springs.

* * * * *